Figures 1, 2:
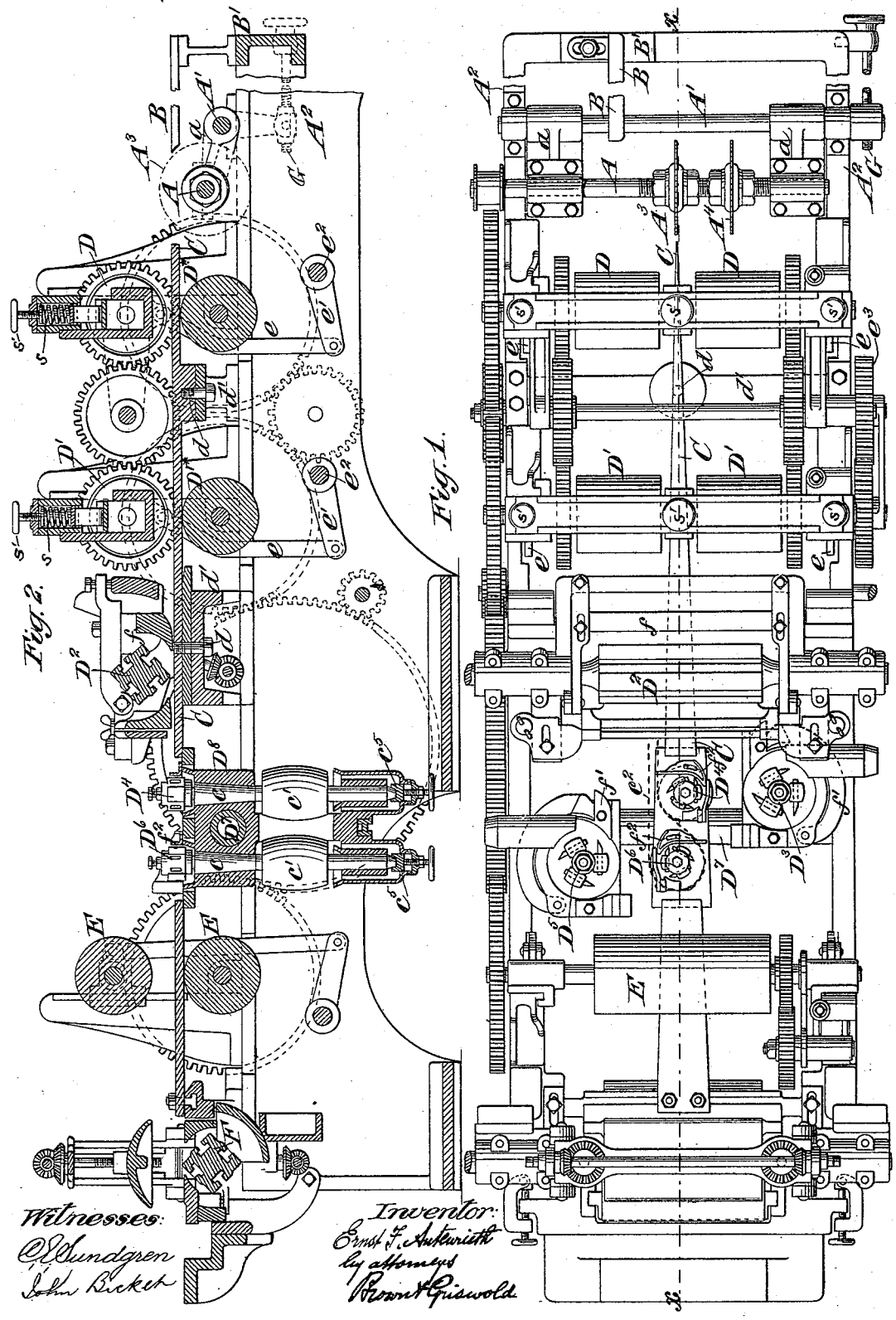

(No Model.)

E. F. AUTENRIETH.
MACHINE FOR SPLITTING, SURFACING, AND MATCHING BOARDS.

No. 440,802. Patented Nov. 18, 1890.

Witnesses:
O. J. Lundgren
John Ricket

Inventor:
Ernst F. Autenrieth
by attorneys
Brown & Griswold

UNITED STATES PATENT OFFICE.

ERNST F. AUTENRIETH, OF NEW YORK, ASSIGNOR TO THE GLEN COVE MACHINE COMPANY, LIMITED, OF BROOKLYN, NEW YORK.

MACHINE FOR SPLITTING, SURFACING, AND MATCHING BOARDS.

SPECIFICATION forming part of Letters Patent No. 440,802, dated November 18, 1890.

Application filed December 12, 1888. Serial No. 293,339. (No model.)

*To all whom it may concern:*

Be it known that I, ERNST F. AUTENRIETH, of New York, in the county of New York and State of New York, have invented certain new and useful Improvements in Machines for Splitting, Surfacing, and Matching Boards, of which the following is a specification.

I will describe in detail a machine for splitting, surfacing, and matching boards, and then point out the novel features in claims.

In the accompanying drawings, Figure 1 is a plan or top view of a machine for splitting, surfacing, and matching boards embodying my improvement. Fig. 2 is a vertical longitudinal section thereof, taken on the line $x\,x$, Fig. 1.

I will only describe such parts of my improvement as are essential to an understanding of my invention.

A designates a shaft suitably journaled in brackets $a$, mounted upon a rock-shaft A', journaled in side portions $A^2$ of the frame. Upon the shaft A are mounted circular saws $A^3\,A^4$.

B designates a guide adjustable widthwise of the machine upon a portion B' of the frame.

In my machine I first split the boards, then surface them upon one side, next pass them between side cutter-heads, whereby they are tongued and grooved, and subsequently surface them upon the other side, the machine being more particularly adapted for making flooring-boards. I pass the board first along the guide B and into contact with the saws $A^3\,A^4$. The saw $A^3$ cuts a strip from the board of a desired width for a flooring-board, while the saw $A^4$ trims the other edge of the board, so that a board of proper width for a flooring-board will be sawed between the saws $A^3\,A^4$. The two boards thus split contact with a tapering or wedge-shaped guide C upon their inner side edges. This guide divides the boards by a gradually-increasing distance. The boards first pass between presser-rollers D D*, and thence between presser-rollers D' D'*. After leaving the presser-rollers D' D'* the boards pass between a surfacer $D^2$, by which their upper sides are surfaced. From the surfacer $D^2$ the board upon one side of the wedge-shaped guide C passes between side cutter-heads $D^3\,D^4$, while the other board passes between other side cutter-heads $D^5\,D^6$. The cutter-heads $D^3\,D^4\,D^5\,D^6$ tongue and groove the two boards in the example of my improvement shown; but of course they may make any other desired cut in the edges of the boards.

It will be observed that the cutter-heads $D^4\,D^6$ are approximately in line with each other in the direction of the length of the machine. It will also be observed that the cutter-heads $D^3\,D^5$ are arranged at an angle to the width of the machine or relatively to each other.

The foregoing arrangements are effected by mounting the cutter-heads $D^3\,D^4$ upon one side of a support $D^7$ and the cutter-heads $D^5\,D^6$ upon the other side of said support. The support $D^7$ consists of a shaft, shown as of tubular construction and extending widthwise of the machine. The cutter-heads are mounted on spindles $c$ near their upper ends, which spindles rotate in boxes $D^8$, secured by clamps or in any other suitable manner to the said support $D^7$. It is therefore apparent that one support suffices for all the cutter-heads $D^3,\,D^4,\,D^5,$ and $D^6$. Two of the spindles $c$—namely, those of the cutter-heads $D^4\,D^6$—I have shown more clearly in Fig. 2. The spindles $c$ have mounted upon them pulleys $c'$, which pulleys upon the spindles driving the cutter-heads $D^4\,D^6$ derive motion from a belt $c^2$, which belt in turn receives motion from a pulley on the main or driving-shaft of the machine. The belt $c^2$ has one part in contact with the pulley $c'$ upon the spindle $c$ for the cutter-head $D^4$, which part passes thence to and around the pulley upon the spindle $c$ for the cutter-head $D^6$, and thence backwardly to the main driving-pulley. A single belt therefore drives both pulleys and spindles. The pulleys $c'$ upon the spindles $c$ for the cutter-heads $D^3\,D^5$ are driven by independent belts in the usual manner. The spindles $c$ preferably have their upper portions tapered downwardly and their lower portions substantially cylindrical, said lower portions being stepped in adjustable step-bearings $c^5$. This construction of spindles enables the same to be freely withdrawn from their bearings. It will be seen that one of the boards passes between the side cutter-heads D³ D⁴ and the other passes between the side cutter-heads D⁵ D⁶, whereby the two boards are tongued and grooved at one and the same time. After leaving the side cutter-heads the boards pass between presser-rollers E and thence over a surfacer F, whereby the under sides of the boards are surfaced.

Referring again to the saws A³ A⁴, I have shown a screw G, by which the rock-shaft A' may be rocked, so as to move the said saws downwardly and into inoperative position. When thus moved the wedge-shaped guide C may be also withdrawn, and then by taking out the cutter-head spindles a single board may be passed through the machine, which may be of the full width of the machine and surfaced and tongued and grooved in the usual manner.

The wedge-shaped guide C may be removed by loosening screws $d$, extending upwardly through cross-bars $d'$ in the frame of the machine and into the said guide.

The top feed-rolls D D' are what are known as "broken" rolls—that is to say, each is composed of two rolls or roll-sections, one roll-section being on one side of the wedge-shaped guide C and the other on the other side of said guide, as shown in Fig. 1, and the said rolls or roll-sections are separately subjected to pressure by springs $s$, (see Fig. 2,) applied to their journal-boxes and adjusted by screws $s'$. The way of mounting the journals of these roll-sections D and D' does not in itself constitute any part of the present invention, and therefore needs no particular description here, and I consider it a sufficient description to say that the said rolls or roll-sections may be mounted and controlled by springs, as described in United States Letters Patent to Alfred B. Hutchinson and myself, No. 389,048, dated February 19, 1889. The broken rolls D D' are necessary, because the split boards pass under them before arriving at the surfacers D², and they may be of different thickness. I have shown compensating gear-wheels $e^3$, acting in conjunction with the driving gear-wheels for the upper of the rollers D D'. In conjunction with the upper surfacer D², I have shown an ordinary chip-breaker $f$, and acting in conjunction with the cutter-heads D³ D⁵ the usual swinging chip-breaker $f'$. I have shown stationary chip-breakers $f^2$, acting in conjunction with the cutter-heads D⁴ D⁶.

I have not entered into a detailed description of the means for driving the various presser-rollers, nor the surfacers D² F, for the same are of the usual and well-known type and may be of any desired kind, my invention consisting wholly in the means for splitting, surfacing, tonguing, and grooving two boards at the same time split from a single board, and also in the arrangement of and means for driving the side cutter-heads.

The taper guide may be left in position and the saws dropped out of the way, so that an operator will be enabled to feed separate boards on each side of taper guides. The guide B must in that case be removed.

I disclaim, broadly, the combination, in a matcher adapted to work two pieces of lumber at the same time, of two cutter-heads rotatable on vertical axes placed relatively to each other in a line nearly parallel to the line of track of the lumber, each cutter-head being adapted to dress an inner edge of one piece of lumber.

What I claim as my invention, and desire to secure by Letters Patent, is—

1. In a planing-machine, the combination, with a saw for slitting a board, of a wedge-shaped guide for separating and guiding the two boards into which the first-mentioned board is slit, presser-rollers, the upper ones of which are broken and have their roll-sections on opposite sides of the said guide, and surfacers above and below said guide and beyond said presser-rollers for surfacing the two boards after they have passed said pressure-rolls, substantially as herein set forth.

2. In a planing-machine, the combination, with a saw for slitting a board, of a wedge-shaped guide for separating and guiding the two boards into which the first-mentioned board is slit, presser-rolls, the upper ones of which are broken and have their roll-sections on opposite sides of the said guide, surfacers above and below said guide and beyond said presser-rolls for surfacing the said two boards, side cutter-heads for planing the side edges of said two boards, and presser-rollers beyond said surfacers and side cutter-heads, all substantially as herein set forth.

ERNST F. AUTENRIETH.

Witnesses:
 FREDK. HAYNES,
 ARTHUR H. GAMBLIN.